(12) United States Patent
Duarte et al.

(10) Patent No.: US 8,451,236 B2
(45) Date of Patent: May 28, 2013

(54) TOUCH-SENSITIVE DISPLAY SCREEN WITH ABSOLUTE AND RELATIVE INPUT MODES

(75) Inventors: Matias Gonzalo Duarte, Sunnyvale, CA (US); Daniel Marc Gatan Shiplacoff, Los Angeles, CA (US); Jeremy Godfrey Lyon, Sunnyvale, CA (US)

(73) Assignee: Hewlett-Packard Development Company L.P., Houston, TX (US)

( * ) Notice: Subject to any disclaimer, the term of this patent is extended or adjusted under 35 U.S.C. 154(b) by 1140 days.

(21) Appl. No.: 12/341,497

(22) Filed: Dec. 22, 2008

(65) Prior Publication Data
US 2010/0156813 A1 Jun. 24, 2010

(51) Int. Cl.
*G06F 3/041* (2006.01)

(52) U.S. Cl.
USPC ........... 345/173; 345/174; 345/175; 345/177; 715/863

(58) Field of Classification Search
None
See application file for complete search history.

(56) References Cited

U.S. PATENT DOCUMENTS

| | | |
|---|---|---|
| 6,323,846 B1 | 11/2001 | Westerman et al. |
| 6,559,833 B2 | 5/2003 | Rowe |
| 6,570,557 B1 | 5/2003 | Westerman et al. |
| 6,677,932 B1 | 1/2004 | Westerman |
| 7,030,861 B1 | 4/2006 | Westerman et al. |
| 7,479,949 B2 | 1/2009 | Jobs et al. |
| 7,605,804 B2 * | 10/2009 | Wilson .......................... 345/173 |
| 2005/0003851 A1 | 1/2005 | Chrysochoos et al. |
| 2005/0057524 A1 | 3/2005 | Hill et al. |
| 2006/0053387 A1 | 3/2006 | Ording |
| 2006/0071913 A1 | 4/2006 | Wang et al. |
| 2006/0085757 A1 | 4/2006 | Andre et al. |
| 2006/0097991 A1 | 5/2006 | Hotelling et al. |
| 2006/0197753 A1 | 9/2006 | Hotelling |
| 2006/0244735 A1 * | 11/2006 | Wilson .......................... 345/173 |
| 2006/0267951 A1 | 11/2006 | Rainisto |
| 2007/0152984 A1 | 7/2007 | Ording et al. |
| 2007/0192731 A1 | 8/2007 | Townsend et al. |
| 2007/0262964 A1 | 11/2007 | Zotov et al. |
| 2007/0273668 A1 | 11/2007 | Park et al. |
| 2007/0291007 A1 | 12/2007 | Forlines et al. |
| 2008/0062139 A1 | 3/2008 | Hotelling et al. |

(Continued)

FOREIGN PATENT DOCUMENTS

KR 1019990059505 7/1999

OTHER PUBLICATIONS

International Preliminary Report on Patentability, International Application No. PCT/US2009/068275, Date of Issuance: Jun. 29, 2011, pp. 1-5.

(Continued)

*Primary Examiner* — Van Chow

(57) ABSTRACT

A touch-sensitive display screen has at least two input modes for touch input. In an absolute input mode, positional information is interpreted in an absolute sense: an on-screen object or cursor can be moved, selected or activated by tapping or touching the screen at the location of the object itself or at a desired location for the object. In a relative input mode, touch input provided on the display screen is interpreted in a manner similar to a virtual joystick or a virtual touchpad. In the virtual joystick relative mode, input is interpreted relative to a reference point on the screen. In the virtual touchpad relative mode, input is interpreted according to a direction of motion of a contact point.

18 Claims, 10 Drawing Sheets

U.S. PATENT DOCUMENTS

| | | |
|---|---|---|
| 2008/0062140 A1 | 3/2008 | Hotelling et al. |
| 2008/0062147 A1 | 3/2008 | Hotelling et al. |
| 2008/0062148 A1 | 3/2008 | Hotelling et al. |
| 2008/0082930 A1 | 4/2008 | Omernick et al. |
| 2008/0084400 A1 | 4/2008 | Rosenberg |
| 2008/0297484 A1 | 12/2008 | Park et al. |
| 2008/0303794 A1 | 12/2008 | Bolt et al. |
| 2008/0309626 A1 | 12/2008 | Westerman et al. |
| 2008/0316183 A1 | 12/2008 | Westerman et al. |
| 2009/0278806 A1* | 11/2009 | Duarte et al. ............ 345/173 |
| 2009/0293007 A1* | 11/2009 | Duarte et al. ............ 715/767 |
| 2010/0095240 A1* | 4/2010 | Shiplacoff et al. ............ 715/784 |
| 2010/0156656 A1* | 6/2010 | Duarte et al. ............ 340/815.4 |
| 2010/0185989 A1* | 7/2010 | Shiplacoff et al. ............ 715/856 |

OTHER PUBLICATIONS

International Search Report and Written Opinion, International Application No. PCT/US2009/068275, Date of Completion: Jul. 30, 2010, Date of Mailing: Aug. 2, 2010, pp. 1-9.

EP Search Report received in EP Application No. 09835618.1, mailed Mar. 18, 2013, pp. 7.

\* cited by examiner

TOUCH-SENSITIVE DISPLAY SCREEN WITH ABSOLUTE AND RELATIVE INPUT MODES

CROSS-REFERENCE TO RELATED APPLICATIONS

The present application is related to U.S. patent application Ser. No. 12/115,992, filed May 6, 2008 for "Extended Touch-Sensitive Control Area for Electronic Device", the disclosure of which is incorporated herein by reference.

The present application is related to U.S. patent application Ser. No. 11/948,885, filed Nov. 30, 2007 for "Computing Device that Determines and Uses Applied Pressure from User Interaction with an Input Interface", the disclosure of which is incorporated herein by reference.

The present application is related to U.S. patent application Ser. No. 11/849,133, filed Aug. 31, 2007 for "Soft-User Interface Feature Provided in Combination with Pressable Display Surface", the disclosure of which is incorporated herein by reference.

FIELD OF THE INVENTION

In various embodiments, the present invention relates to input mechanisms for controlling electronic devices, and more particularly to a touch-sensitive display screen having absolute and relative input modes.

DESCRIPTION OF THE RELATED ART

It is well-known to provide touch-sensitive display screens for electronic devices. Touch-sensitive display screens allow an electronic display to function as an input device, thus providing great flexibility in the type of interactions that can be supported. In many devices, touch-sensitive display screens are used to replace pointing devices such as trackballs, mice, five-way switches, and the like. In other devices, touch-sensitive display screens can supplement, or be supplemented by, other input mechanisms.

Touch-sensitive display screens provide several advantages over other input mechanisms. Touch-sensitive display screens can replace physical buttons by providing on-screen buttons that can be touched by the user. The on-screen buttons can be arranged so that they resemble an alphabetic or numeric keyboard, or they can have specialized functions. This often simplifies input operations by providing only those options that are relevant at a given time.

Touch-sensitive display screens can also help to provide customizability and globalization of input mechanisms. An on-screen keyboard can be easily adapted to any desired language, and extra keys can be provided as appropriate to the specific application. Certain buttons can be highlighted, moved, or otherwise modified in a dynamic way to suit the application.

In addition, touch-sensitive display screens can be more reliable than physical keyboards, because they reduce the reliance on moving parts and physical switches.

One particular advantage of touch-sensitive display screens is that they allow direct manipulation of on-screen objects, for example by facilitating control and/or activation of such objects by touching, tapping, and/or dragging. Thus, when a number of items are displayed on a screen, touch-sensitivity allows a user to perform such operations on specific items in a direct and intuitive way.

However, some operations in connection with control of an electronic device are not particularly well suited to direct manipulation. Fine movement of a cursor or other on-screen object, for example, may be difficult in a touch-sensitive display screen, particularly if the user is using a finger rather than a more precise pointer such as a stylus.

Conventionally, touch-sensitive display screens respond to user input based on the absolute location of the user's finger (or other pointer) when the finger makes contact with the screen. For example, a user can touch an on-screen button to activate the button. Alternatively, a user can move an on-screen cursor by touching the screen at the location at which the cursor should be placed, or by dragging a cursor from one location to another.

Other input devices, such as touchpads and joysticks, respond to user input based on relative motion. A touchpad is a touch-sensitive input device that translates the location and movement of a user's fingers into relative motion of a cursor or other object on a screen. For example, when the user moves a finger along a touchpad, an on-screen cursor changes location based on a direction and magnitude of the finger movement, rather than on the absolute location of the finger.

Similarly, a joystick can be used to move an onscreen cursor or object in the direction the joystick is pushed. The speed of movement can be fixed, or it can vary depending on how hard the joystick is pushed in the desired direction.

Compact devices, such as cellular telephones, personal digital assistants, smartphones, and the like, typically have a small form factor that does not allow for auxiliary input devices such as touchpads and joysticks. Accordingly, devices with touch-sensitive display screens generally do not provide any unified input mechanism for both absolute and relative positioning of an on-screen cursor or other object.

What is needed is a touch-sensitive display screen that provides modes for both absolute and relative input. What is further needed is a screen-based input mechanism that allows users to provide both absolute and relative input using a single unified input device without being required to switch from one input device to another.

SUMMARY OF THE INVENTION

According to various embodiments of the present invention, a touch-sensitive display screen has at least two input modes. In a first input mode (referred to herein as "absolute mode"), positional information is interpreted in an absolute sense. For example, user input is interpreted as direct manipulation of an on-screen cursor or object. Thus, a cursor or other object can be placed at or moved to the location where the user touches the screen. If the user moves his or her finger along the touch-sensitive display screen, the cursor or object moves with the finger so that it remains at or near the point of contact. In this absolute mode, an on-screen object (such as a button or icon) can be selected or activated by tapping or touching the screen at the location of the object itself or at a desired location for the object.

In various embodiments, in a second input mode (referred to herein as "relative mode"), user interaction with the touch-sensitive display screen is interpreted in a relative sense. In one embodiment, a virtual joystick relative input mode is provided. A reference point on the screen is established, either at the point of contact with the screen or at a current cursor location or last point of contact, or at some other location. The user touches the screen at some location, or performs a drag operation, and an on-screen cursor (or other object) is moved based on the location of the point of contact relative to the reference point. In various embodiments, the user can alter the direction and/or speed of movement as it is occurring by changing the point of contact with the screen.

In the virtual joystick relative mode, the speed of movement of the on-screen cursor can be fixed, or can vary depending on the distance between the point of contact and the reference point. Thus, the user can speed up movement of the on-screen cursor by moving his or her finger away from the reference point, or can slow down movement by his or her finger closer to the reference point.

In various embodiments, the virtual joystick relative mode can also be used for initiating and controlling scroll operations. A reference point is established, either at the point of contact with the screen or at a current cursor location or last point of contact, or at some other location. The user touches the screen at some location, or performs a drag operation. In response, the display (or a window thereon) is scrolled based on the location of the new point of contact relative to the reference point. The speed of the scrolling operation can be fixed, or can vary depending on the distance between the point of contact and the reference point. Thus, the user can speed up the scroll operation by moving his or her finger away from the reference point, or can slow down movement by moving his or her finger closer to the reference point.

In some embodiments, an indicator may be activated to indicate which mode is currently in operation. In some embodiments, virtual joystick relative motion is denoted by a representation of a five-way control superimposed on the current display. The center point of the five-way control can indicate the reference point for relative motion. In another embodiment, an on-screen or off-screen indicator denotes which mode is active.

In another embodiment, a virtual touchpad relative input mode is provided. In this mode, movement of a cursor (or any other object) is controlled by a direction of motion of a contact point, rather than by a location of the contact point with respect to a reference point. Again, the movement of the cursor can continue as long as the user continues to touch the screen and/or as long as the user continues to move his or her finger. In various embodiments, the user can alter the direction and/or speed of movement as it is occurring by changing the point of contact with the screen.

In some embodiments, activation of relative mode causes a portion of the screen to function in relative mode while the remainder of the screen functions in absolute mode.

In some embodiments, even when in relative mode, on-screen objects can be activated or selected by tapping directly on the object. Thus, the device distinguishes between a tap-hold-drag action (resulting in relative motion) and a tap action (resulting in activation or selection of an object specified by absolute location). In some embodiments, the device further distinguishes between a tap-hold-drag action performed while positioned on an onscreen cursor or other object (resulting in absolute motion of the cursor or object) and a tap-hold-drag action performed while not positioned on any onscreen object (resulting in relative motion).

Accordingly, in various embodiments, by providing the user with the ability to switch between absolute and relative mode for a touch-sensitive display screen, or by switching automatically among available modes, the present invention provides improved control of on-screen cursors and scrolling operations. In particular, the invention provides the user with a mechanism for fine control of movement of on-screen cursors and other objects.

Additional advantages will become apparent in the following detailed description.

BRIEF DESCRIPTION OF THE DRAWINGS

The accompanying drawings illustrate several embodiments of the invention and, together with the description, serve to explain the principles of the invention. One skilled in the art will recognize that the particular embodiments illustrated in the drawings are merely exemplary, and are not intended to limit the scope of the present invention.

DETAILED DESCRIPTION OF THE EMBODIMENTS

System Architecture

In various embodiments, the present invention can be implemented on any electronic device, such as a handheld computer, personal digital assistant (PDA), personal computer, kiosk, cellular telephone, remote control, data entry device, and the like. For example, the invention can be implemented as part of a user interface for a software application or operating system running on such a device.

In various embodiments, the invention is particularly well-suited to devices such as smartphones, handheld computers, and PDAs, which have limited screen space that make fine control of on-screen cursors and objects difficult. In particular, many such devices include touch-sensitive display screens that are intended to be controlled by a user's finger; such devices inherently suffer from a lack of precision in the user's input. Accordingly, it is often difficult in such devices for a user to specify an exact on-screen location for a cursor or other object. One skilled in the art will recognize, however, that the invention can be practiced in many other contexts, including any environment in which it is useful to provide both absolute and relative modes of input for a touch-sensitive display screen or similar input device. Accordingly, the following description is intended to illustrate the invention by way of example, rather than to limit the scope of the claimed invention.

Figure 1:
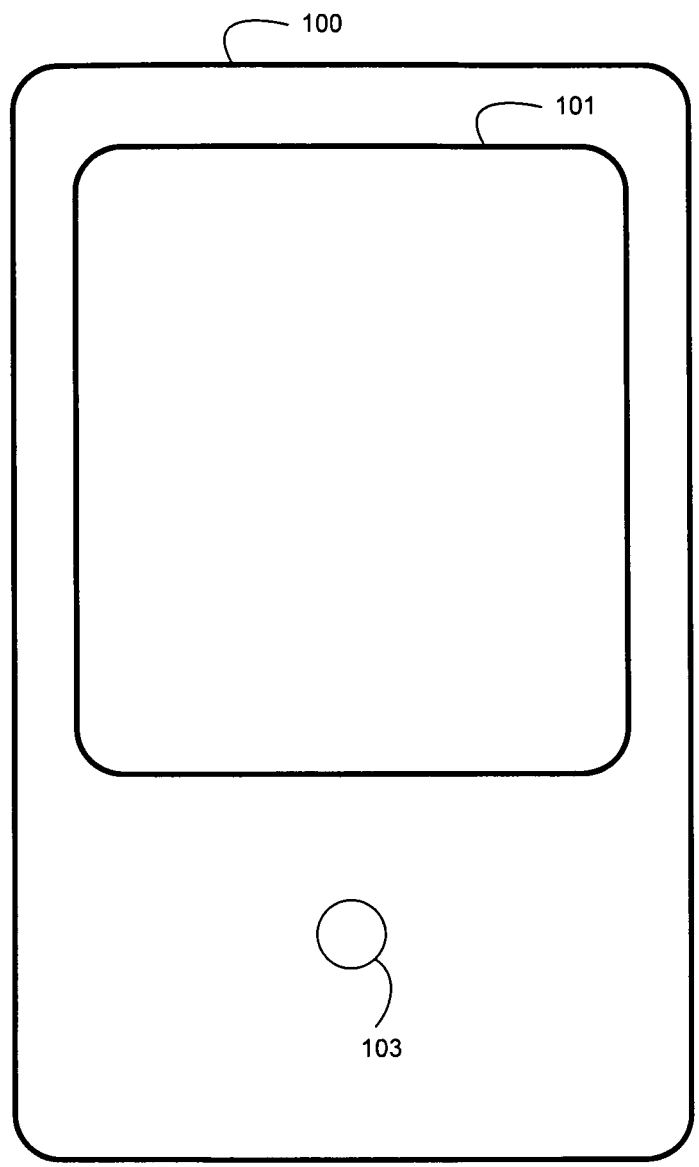
FIG. 1 depicts an example of a device having a touch-sensitive display screen for implementing the invention according to one embodiment.

Referring now to FIG. 1, there is shown an example of a device 100 having a touch-sensitive display screen 101 that can be used for implementing the present invention according to one embodiment. In various embodiments, the operation of the present invention is controlled by a processor (not shown) of device 100 operating according to software instructions of an operating system and/or application.

In one embodiment, device 100 as shown in FIG. 1 also has a physical button 103. In one embodiment, physical button 103 can be used to perform some common function, such as to return to a home screen or to activate a selected on-screen item. Physical button 103 is not needed for the present invention, and is shown for illustrative purposes only. One skilled in the art will recognize that any number of such buttons 103, or no buttons 103, can be included, and that the number of physical buttons 103, if any, is not important to the operation of the present invention.

For illustrative purposes, device 100 as shown in FIG. 1 is a personal digital assistant or smartphone. Such devices commonly have telephone, email, and text messaging capability, and may perform other functions including, for example, playing music and/or video, surfing the web, running productivity applications, and the like. The present invention can be implemented in any type of device having a touch-sensitive display screen, and is not limited to devices having the listed functionality. In addition, the particular layout shown in FIG. 1 is merely exemplary and is not intended to be restrictive of the scope of the claimed invention. For example, screen 101, button 103, and other components can be arranged in any configuration; the particular arrangement and appearance shown in FIG. 1 is merely one example.

In various embodiments, touch-sensitive display screen 101 can be implemented using any technology that is capable of detecting a location for a point of contact. One skilled in the art will recognize that many types of touch-sensitive display screens and surfaces exist and are well-known in the art, including for example:
- capacitive screens/surfaces, which detect changes in a capacitance field resulting from user contact;
- resistive screens/surfaces, where electrically conductive layers are brought into contact as a result of user contact with the screen or surface;
- surface acoustic wave screens/surfaces, which detect changes in ultra-sonic waves resulting from user contact with the screen or surface;
- infrared screens/surfaces, which detect interruption of a modulated light beam or which detect thermal induced changes in surface resistance;
- strain gauge screens/surfaces, in which the screen or surface is spring-mounted, and strain gauges are used to measure deflection occurring as a result of contact;
- optical imaging screens/surfaces, which use image sensors to locate contact;
- dispersive signal screens/surfaces, which detect mechanical energy in the screen or surface that occurs as a result of contact;
- acoustic pulse recognition screens/surfaces, which turn the mechanical energy of a touch into an electronic signal that is converted to an audio file for analysis to determine location of the contact; and
- frustrated total internal reflection screens, which detect interruptions in the total internal reflection light path.

Any of the above techniques, or any other known touch detection technique, can be used in connection with the device of the present invention, to detect user contact with screen 101, either with a finger, or with a stylus, or with any other object.

In one embodiment, the present invention can be implemented using a screen 101 capable of detecting two or more simultaneous touch points, according to techniques that are well known in the art.

In one embodiment, the present invention can be implemented on a device 100 wherein touch input can also be received on a gesture area (not shown), as described in related U.S. patent application Ser. No. 12/115,992, filed May 6, 2008 for "Extended Touch-Sensitive Control Area for Electronic Device", the disclosure of which is incorporated herein by reference. In such an embodiment, user input entered on the gesture area (or elsewhere) can be used to indicate a relative or absolute input mode, as described in more detail below.

In one embodiment, the present invention can be implemented using other recognition technologies that do not necessarily require contact with the device. For example, a gesture may be performed proximate to the surface of screen 101, or it may begin proximate to the surface of screen 101 and terminate with a touch on screen 101. It will be recognized by one with skill in the art that the techniques described herein can be applied to such non-touch-based gesture recognition techniques.

Absolute and Relative Input Modes

According to various embodiments of the present invention, touch-sensitive display screen 101 has at least two input modes: an absolute mode and a relative mode.

Absolute Mode

Figure 5:
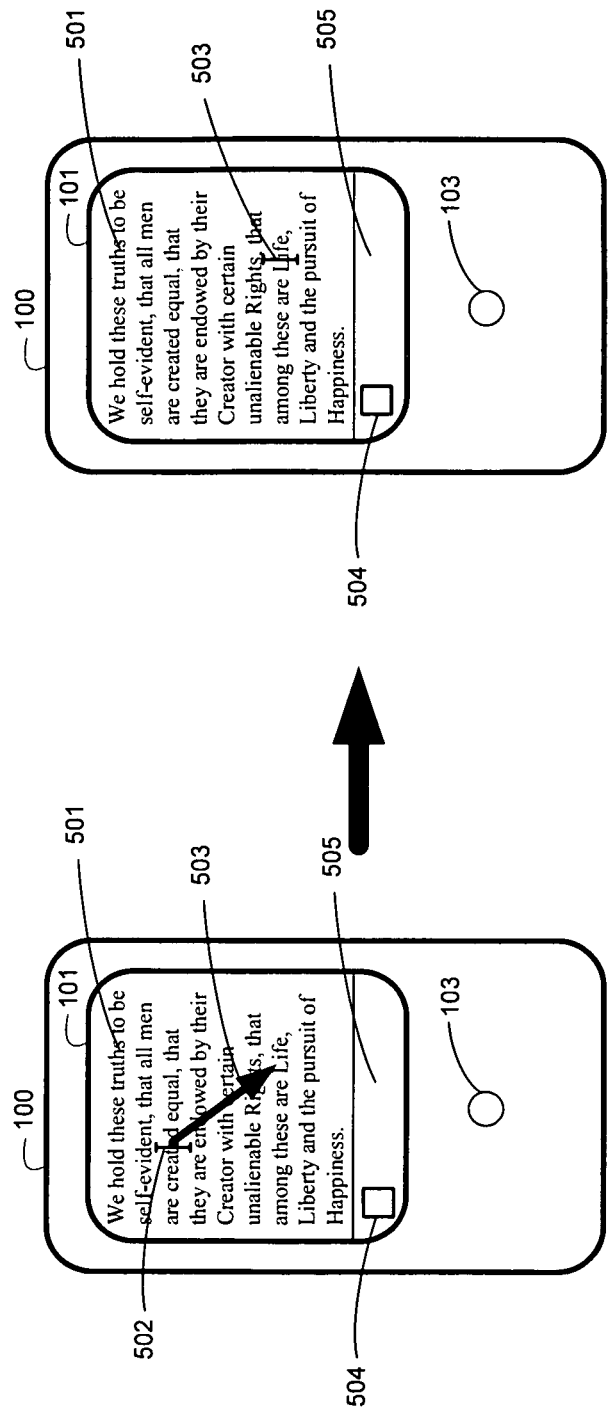
FIG. 5 depicts an example of an absolute input mode for controlling a cursor, according to one embodiment.

Referring now to FIG. 5, there is shown an example of the operation of device 100 while in absolute mode, according to one embodiment. In this mode, positional information is absolute: user input is interpreted as direct manipulation of an on-screen cursor or object. For example, cursor 502 moves within text block 501 based on the absolute location of a point of contact between the user's finger (or stylus or the like) and screen 101. If the user touches screen 101, cursor 502 moves to the point of contact. If the user moves his or her finger along screen 101 (as shown by arrow 503 in FIG. 5), cursor 502 moves with the finger so that cursor 502 remains at or near the point of contact.

Absolute mode can optionally be denoted by the presence or absence of some indicator, either on screen 101 or elsewhere on device 100. For example, in FIG. 5 an embodiment is depicted wherein absolute mode is depicted by on-screen indicator 504 in a control area 505 of screen 101.

Figure 6:
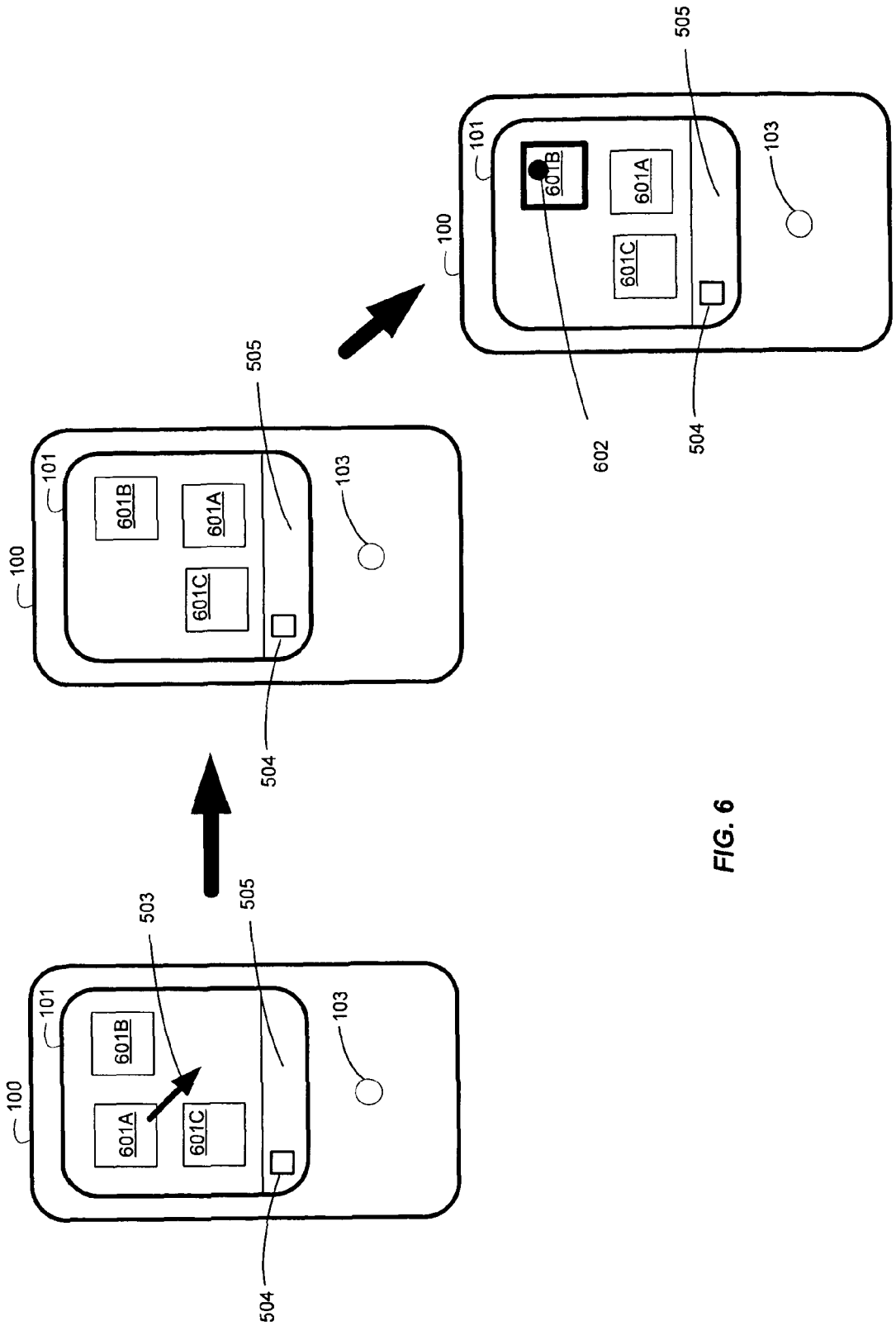
FIG. 6 depicts an example of an absolute input mode for controlling an on-screen object, according to one embodiment.

Absolute mode can also be used for direct manipulation of on-screen objects other than cursor 502. Referring now to FIG. 6, there is shown an example of the operation of device 100 while in absolute mode, to move object 601A of a set of objects 601A, B, C, according to one embodiment. In the leftmost portion of FIG. 6, the user initiates a drag operation by touching the screen at the location of object 601A and dragging in the direction of desired movement for object 601A. In the center portion of FIG. 6, object 601A has been moved from its original location to a new location specified by the absolute location where the user released his or her finger from contact with screen 101. Thus, in one embodiment, interaction in this mode takes place according to the absolute location of the contact point with screen 101.

In addition, in this absolute mode, an on-screen object (object 601B) can be selected or activated by tapping or touching the screen at the location of the object itself. In the rightmost part of FIG. 6, the user has tapped on object 601B (the tap operation is indicated by large black dot 602); object 601B is therefore highlighted to indicate that it is selected for activation or further operations.

The user can cause device 100 to switch between absolute and relative modes by any known input means. For example, icon 504 may function as a toggle between the modes; the user taps on icon 504 to switch from one mode to the other. The appearance of icon 504 may change to indicate which mode is active. Alternatively, the user can select a mode by pressing button 103, or any other physical or virtual button, or by flipping a switch, or by selecting a command from a menu (not shown), entering a command on a keyboard (not shown), entering a gesture, or by any other mechanism. In another embodiment, device 100 can automatically switch from one mode to the other depending on the nature of the user's input, the context in which the input operation is performed, the content and/or objects currently being displayed on screen 101, or any combination thereof.

Virtual Joystick Relative Mode

Figure 7:
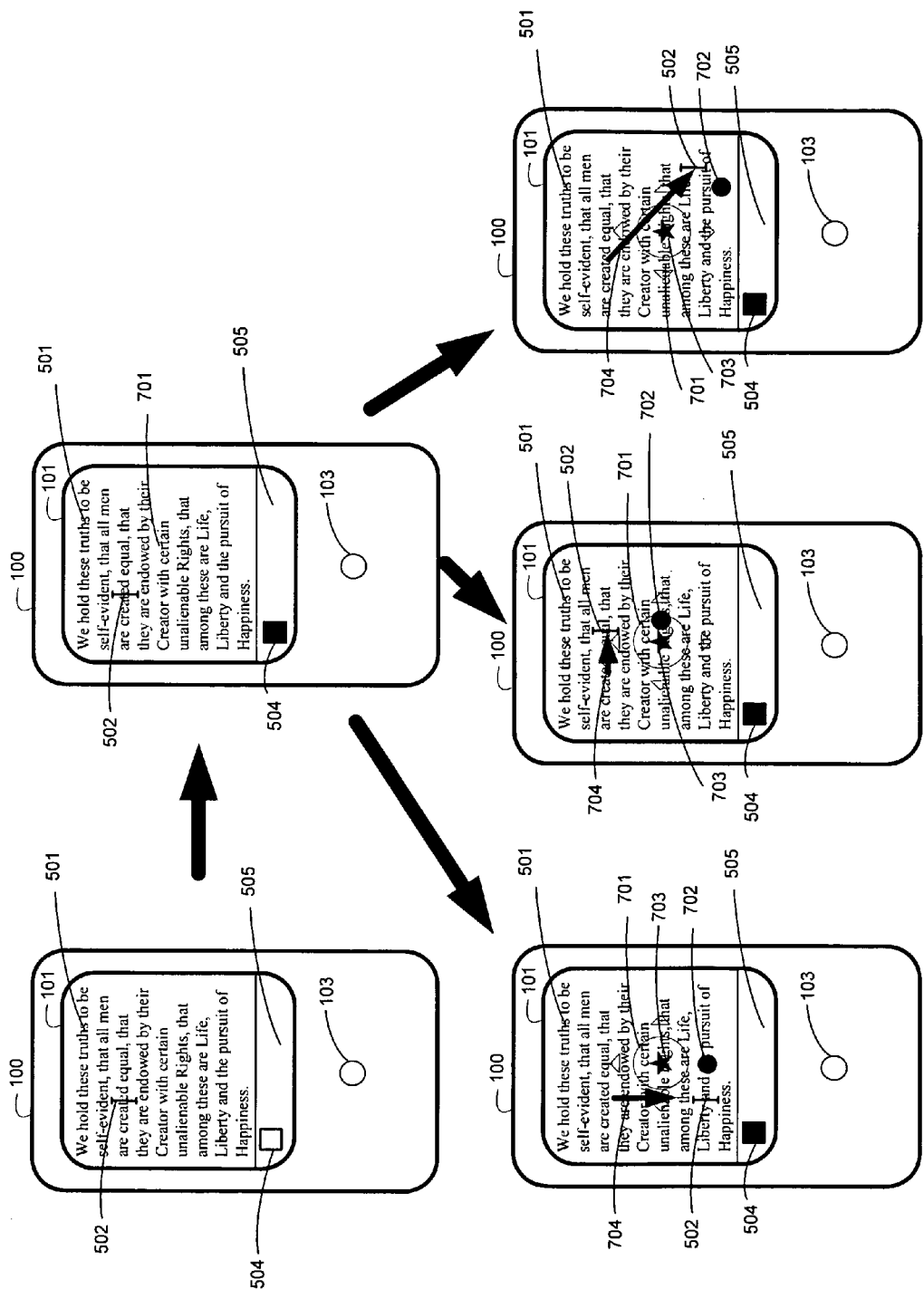
FIG. 7 depicts examples of a virtual joystick relative input mode for controlling a cursor, according to one embodiment.

Referring now to FIG. 7, there is shown an example of the operation of device 100 to move cursor 502 while in a first relative mode based on a "virtual joystick" input paradigm according to one embodiment. Here, user interaction with screen 101 is interpreted according to a paradigm that simulates operation of a joystick or four-way, eight-way, or N-way directional controller, as described below.

In one embodiment, once virtual joystick relative mode has been initiated, the user touches screen 101, establishing a reference point 703. Reference point 703 may or may not be visually depicted on screen 101. In FIG. 7, reference point 703 is indicated by a star for illustrative purposes, although the star itself may or may not be displayed on screen 101. In the example, reference point 703 is located at the center of target indicator 701 overlaid on the contents of window 101. Thus, in one embodiment, target indicator 701 can be shown without the central star, in which case the location of reference point 703 can be inferred based on the center of target indicator 701. Target indicator 701 provides an indication to the user that the device is in a mode where his or her input will be interpreted in relation to a particular point, i.e. reference point 703. Target indicator 701 can resemble a five-way controller, or joystick, or can have any desired appearance. In some embodiments, target indicator 701 can be omitted completely if desired.

In addition, as shown in FIG. 7, the appearance of icon 504 may change, or some other indicator can be provided, to act as a reminder of the current mode. In other embodiments, on-screen text or other indicators can be used to inform the user that relative mode is active.

The particular location of reference point 703 can be determined or selected based on any of a number of different factors. In one embodiment, reference point 703 can be fixed at the center of screen 101 or at the center of a display area of screen 101 or at some other predetermined location. In another embodiment, reference point 703 can be established at the current location of cursor 502. In yet another embodiment, reference point 703 can be established at a location indicated by the user, for example at an initial point of contact with screen 101 after relative mode has been activated.

In one embodiment, once device 100 has been placed in virtual joystick relative mode, subsequent user input is interpreted relative to reference point 703. For example, in one embodiment, cursor 502 moves in a direction corresponding to a vector having a start point at reference point 703 and an end point at the location of user contact with screen 101. In FIG. 7, for illustrative purposes only, the location of user contact is indicated by dot 702 and the direction and magnitude of cursor 502 movement is indicated by arrow 704; in general, in one embodiment, neither dot 702 nor arrow 704 would actually appear on screen 100.

Thus, if the user touches the screen to the left of reference point 703, cursor 502 moves to the left; if the user touches the screen at a location northwest of reference point 703, cursor 502 moves in the corresponding direction. In one embodiment, cursor 502 continues to move as long as the user maintains contact with screen 101 at a point other than reference point 703. In one embodiment, cursor 502 stops moving if the user lifts his or her finger from screen 101 or moves his or her finger to reference point 703.

In one embodiment, the magnitude of the vector determines the speed of cursor 502 movement, so that cursor 502 moves more quickly if contact point 702 is located further from reference point 703. The relationship between vector magnitude and cursor speed can be linear, geometric, logarithmic, exponential, or can have any other relationship. Thus, the user can speed up movement of cursor 502 by moving his or her finger away from reference point 703, or can slow down movement by moving his or her finger closer to reference point 703. In another embodiment, the speed of cursor 502 movement does not depend on the magnitude of the vector: the speed can be held constant, or it can vary depending on how long contact is maintained (for example to speed up movement if the user maintains contact for a longer period of time), or it can vary depending on the context of the input operation or based on any other factor or combination of factors. In another embodiment, the speed can vary depending on how hard the user presses on screen 101. A force sensor or pressure sensing device can be used to detect variations in force or pressure, as described in related U.S. patent application Ser. No. 11/948,885, filed Nov. 30, 2007 for "Computing Device that Determines and Uses Applied Pressure from User Interaction with an Input Interface", the disclosure of which is incorporated herein by reference.

In one embodiment, the movement of cursor 502 continues as long as the user continues to touch screen 101. In various embodiments, the user can alter the direction and/or speed of movement as it is occurring by changing the point of contact with screen 101. For example, if the direction of the vector changes while cursor 502 is in motion, the direction of cursor 502 motion changes accordingly. In addition, in one embodiment, if the magnitude of the vector changes while cursor 502 is in motion (such as if the user moves his or her finger closer to or farther from reference point 703), the speed of cursor 502 motion changes accordingly. This allows the user to adjust the direction and/or speed of cursor 502 movement in an intuitive and precise manner, thus providing fine motion control even on a small screen.

In another embodiment, cursor 502 moves some amount in response to the user's touch, but does not continue to move as long as the user continues to touch screen 101. In order to move cursor 502 more, the user released contact and touches screen again 101. Thus, continued movement is accomplished by repeated touches.

FIG. 7 depicts several examples of cursor 502 movement based on different contact points 702. In these examples, a greater degree of cursor 502 movement is shown for those contact points 702 located farther from reference point 703 denoted by the center of indicator 701. This greater degree of cursor 502 movement is indicative of a higher speed of motion as described above for some embodiments of the present invention.

In one embodiment, the virtual joystick relative mode remains active as long as the user maintains contact with screen 101; when the user lifts his or her finger from screen 101, device 100 reverts to absolute mode. In another embodiment, the virtual joystick relative mode remains active even when the user lifts his or her finger from screen; device 100 switches to absolute mode in response to an affirmative selection of absolute mode by the user or based on some other trigger event.

Figure 10:
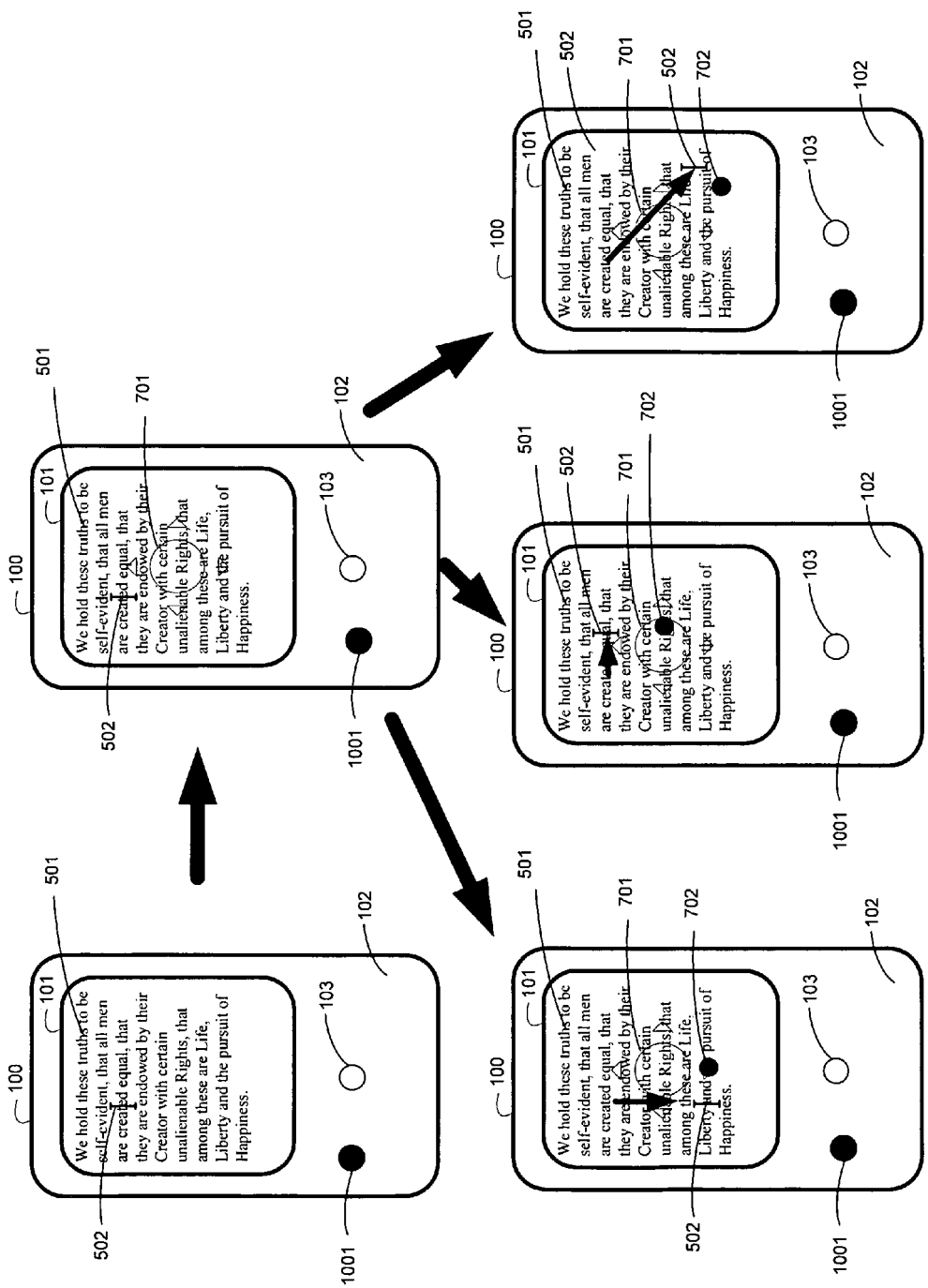
FIG. 10 depicts examples of a virtual joystick relative input mode for controlling a cursor, activated by a user tapping and holding within a gesture area, according to one embodiment.

Referring now to FIG. 10, there is shown an alternative mechanism for activating the virtual joystick relative mode, for a device 100 having a gesture area 102 as described in related U.S. patent application Ser. No. 12/115,992, filed May 6, 2008 for "Extended Touch-Sensitive Control Area for Electronic Device", the disclosure of which is incorporated herein by reference. As described in the related application, gesture area 102 provides an additional touch-sensitive surface upon which user input can be detected. Accordingly, as shown in FIG. 10, the user can touch and hold at a point on gesture area 102 (as indicated by contact point 1001) to temporarily activate the virtual joystick relative mode until the user releases contact with gesture area 102. Indicator 701 appears, and remains on-screen as long as virtual joystick relative mode is active. The user can then interact with device 100 to move cursor 502 as described above in connection with FIG. 7.

For illustrative purposes, in FIG. 10, indicator 701 does not explicitly show reference point 703, although the location of reference point 703 can be inferred as being at the center of indicator 701. In one embodiment, virtual joystick relative mode remains active as long as the user maintains contact with gesture area 102.

Figure 8:
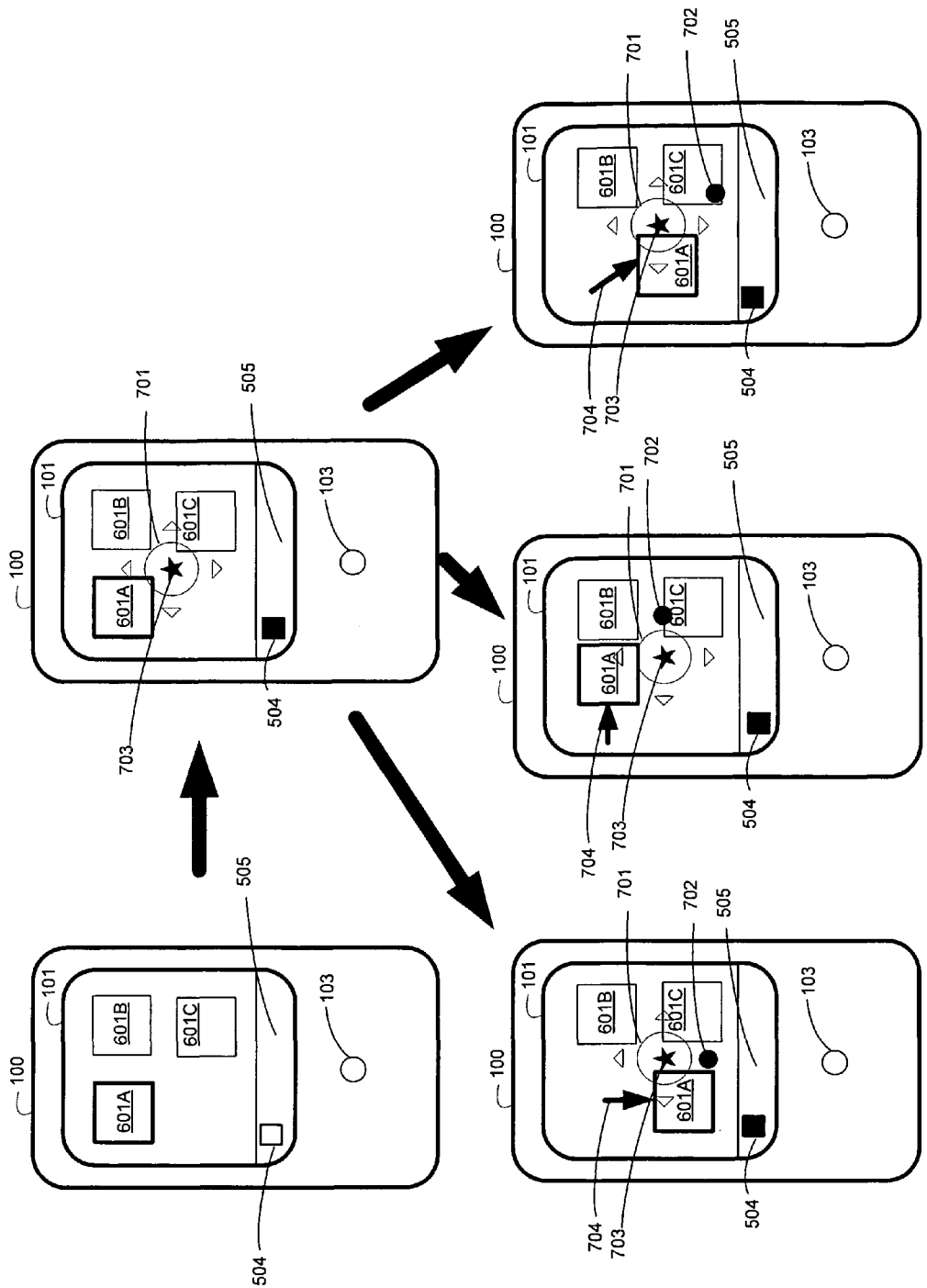
FIG. 8 depicts examples of a virtual joystick relative input mode for controlling an on-screen object, according to one embodiment.

Although FIGS. 7 and 10 depict movement of a cursor 502, one skilled in the art will recognize that similar operations can be performed on any on-screen object, not limited to cursors. For example, referring now to FIG. 8, there is shown an example of a virtual joystick relative mode for controlling a location of an on-screen object 601A. In the example, three on-screen objects 601A, 601B, 601C are depicted; one object 601A is shown in a highlighted state, indicating that it has been selected for further action. For example, the user can tap on object 601A to select it. Then, absolute mode is entered, and reference point 703 is established. As described above, reference point 703 can be indicated, for example, by target indicator 701. Object 601A then moves in the same manner as described above for cursor 502 of FIGS. 7 and 10. In FIG. 8, for illustrative purposes only, the location of user contact is indicated by dot 702 and the direction and magnitude of object 601A movement is indicated by arrow 704; in general, in one embodiment, neither dot 702 nor arrow 704 would actually appear on screen 100.

One skilled in the art will thereby recognize that virtual joystick relative mode can be used for any on-screen object, and is not limited to cursors 502 or any other particular type of object.

In various embodiments, virtual joystick relative mode can also be used for initiating and controlling scroll operations. As described above, a reference point 703 is established, either at the point of contact with screen 101 or at a current cursor location or last point of contact. The user drags in a direction away from reference point 703. In response to the drag action, content 501 shown on display screen 101 (or on a window thereon) is scrolled based on the location of the new point of contact relative to reference point 703. In one embodiment, the scroll direction is determined by a vector having a start point at reference point 703 and an end point at the location of user contact with screen 101. The speed of the scrolling operation can be fixed, or can vary depending on the distance between the point of contact and reference point 703 (in other words, depending on the magnitude of the vector). In such an embodiment, the user can speed up the scroll operation by moving his or her finger away from reference point 703, or can slow down movement by moving his or her finger closer to reference point 703. The user can also alter the direction of scrolling by changing the location of his or her finger while the scroll operation is in progress.

Virtual Touchpad Relative Mode

In another embodiment, device 100 provides a "virtual touchpad" relative mode, wherein movement of cursor 502 (or any other object) is controlled by a direction of motion of a contact point, rather than by a location of the contact point with respect to a reference point. In this embodiment, the touch-sensitive screen 101 interprets user input in a manner similar to the operation of a touchpad. The entire screen 101, or some portion thereof, thus functions as a virtual touchpad, including, potentially, areas of screen 101 that contain content, objects, or other items. This ability to provide a virtual touchpad relative mode is particularly useful for compact devices where a conventional touchpad is not available because of the space requirements needed for such an input device.

Figure 9:
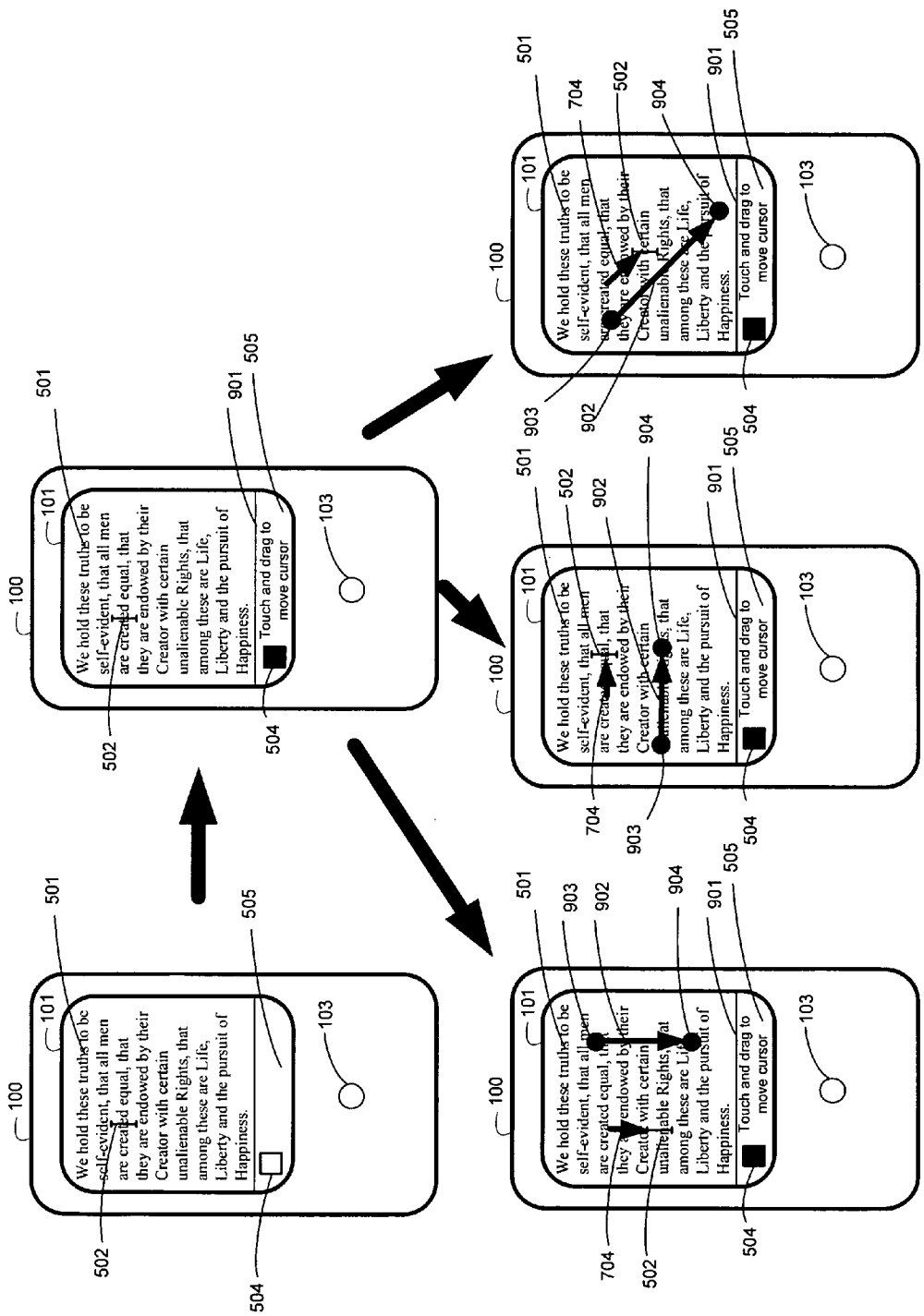
FIG. 9 depicts examples of a virtual touchpad relative input mode for controlling a cursor, according to one embodiment.

Referring now to FIG. 9, there is shown an example of a virtual touchpad relative mode for controlling cursor 502. As before, device 100 enters relative mode, here denoted by a change in appearance of icon 504 as well as by text message 901 in control area 505, informing the user that cursor 502 can be moved by touching and dragging on screen 101. The user then performs touch-hold-drag input on screen 101, as shown by arrows 902 and dots 903, 904 for illustrative purposes only. This type of input usually consists of the user making contact with the touch-sensitive display screen 101, and then moving his or her finger along screen 101 while maintaining contact. Dot 903 indicates the starting point of a touch-hold-drag input operation, dot 904 indicates the end point, and arrow 903 indicates the direction of the drag. In one embodiment, neither dots 903, 904 nor arrow 903 would actually appear on screen 100.

In one embodiment, cursor 502 moves according to the direction and magnitude of the touch-hold-drag input. In one embodiment, the speed of cursor 502 movement depends on the speed of the touch-hold-drag input, while the magnitude of cursor 502 movement depends on the magnitude of the touch-hold-drag input. In another embodiment, the speed and/or magnitude of cursor movement 502 can be held constant or can vary with factors other than the speed and/or magnitude of the touch-hold-drag input.

In the example of FIG. 9, arrow 704 indicates the direction and amount of cursor 502 movement for illustrative purposes only; in general, in one embodiment, arrow 704 would not actually appear on screen 100.

In a manner similar to conventional touchpads, while performing touch-hold-drag input, the user can lift his or her finger from screen 101 and initiate contact at another location on screen 101. Cursor 502 does not change location while the user's finger is not in contact with screen 101. This provides a way for a user to continue moving cursor 502 in a given direction even after the user's finger has reached an edge of screen 101; the user can reposition his or her finger at a location on screen 101 that permits continued dragging in the same direction. Such an action is familiar to users of conventional touchpads as a mechanism for facilitating large degrees of on-screen movement on an input device of limited size. Thus, in various embodiments, the present invention makes use of input conventions that have become well-known and comfortable for users in the context of conventional touchpads.

In various embodiments, virtual touchpad relative mode can be provided in addition to, or instead of, virtual joystick relative mode. In various embodiments, either or both of these relative modes can be provided in addition to the absolute mode described above.

Automated Mode Selection

In some embodiments, as described above, the user can specify which mode should be active at any given time. In another embodiment, mode selection can take place automatically depending on the current context of the input operation and/or the nature of the input operation. For example, in one embodiment, a touch-hold-drag operation initiated within control area 505 is automatically interpreted in one of the relative modes, while touch input on other parts of screen 101 is interpreted in absolute mode. Thus, the user need not specify modes or affirmatively toggle between modes.

In another embodiment, a determination as to which mode should be used can depend on the nature of the user's input: for example, a tap or touch can be interpreted in an absolute mode, to activate or select an object at the point of contact, while a touch-hold-drag can be interpreted in one of the relative modes. Alternatively, a touch-hold-drag can be interpreted in one of the relative modes if initiated at a location where there is no on-screen object, while the same input action can be interpreted in an absolute mode if initiated at a location where there an on-screen object (for example, causing the object to move based on the absolute location of the user's input).

In addition, in some embodiments, activation of one of the relative modes causes a portion of the screen to function in the relative mode while the remainder of the screen functions in absolute mode.

Examples of Methods

Figure 2:
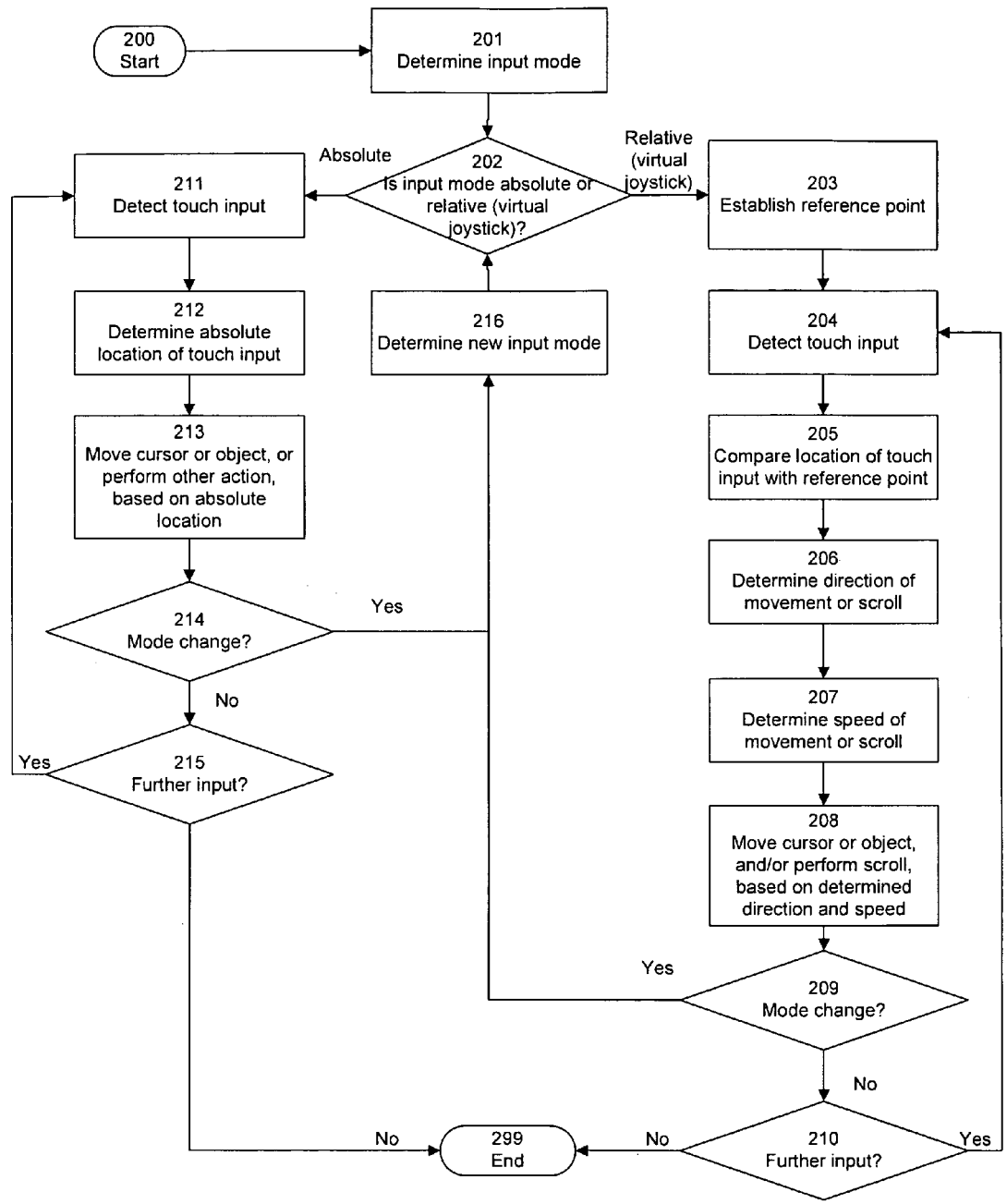
FIG. 2 is a flowchart depicting a method of interpreting user input on a touch-sensitive display screen capable of an absolute mode and a virtual joystick relative mode, according to one embodiment of the present invention.

Referring now to FIG. 2, there is shown a flowchart depicting a method of interpreting user input on a touch-sensitive display screen capable of an absolute mode and a virtual joystick relative mode, according to one embodiment of the present invention.

The method begins 200. An input mode is determined 201. The input mode can be explicitly selected by the user, or can be automatically determined based on the nature of the content being displayed, the state of the device, or the nature of the input. Based on the determination, a decision 202 is made as to whether to execute steps 211 through 215 (for absolute mode) or steps 203 through 210 (for virtual joystick relative mode).

If absolute mode is active, touch input is detected 211 and the absolute location of the touch input is determined 212. Then, onscreen cursor 502 (or other object) is moved to the determined location. Alternatively, some action is performed responsive to the touch input; for example, an icon or object can be activated in response to the user tapping on it. If the input mode changes 214, the new input mode is determined 216 and the method returns to step 202. If the input mode does not change, and the user provides further input 215, the method returns to step 211. If no further input is received, the method ends 299.

If, in step 202, virtual joystick relative mode is active, reference point 703 is established. As discussed above, reference point 703 can be fixed at the center of screen 101, or at the center of a display area of screen 101, or at some other predetermined location, or it can be established at the current location of cursor 502, or at a location indicated by the user, for example at an initial point of contact with screen 101 after relative mode has been activated.

Touch input is detected 204. The location of the touch input is compared 205 with reference point 703, to determine a direction and magnitude of a vector having a start point at the reference point 703 and an end point at the location of the touch input. Then, a direction of movement or scroll operation is determined 206, based on the direction of the vector. A speed of movement or scroll operation is determined 207 as well; this can be a fixed speed, or based on the magnitude of the vector, or based on some other factor. As discussed above, if the speed is based on the magnitude of the vector, the relationship between magnitude and speed of movement (or scroll operation) can be linear, geometric, logarithmic, exponential, or any other relationship.

Cursor 502 (or other object) is moved, and/or scrolling is performed 208, based on the determined direction and speed.

If the input mode changes 209, the new input mode is determined 216 and the method returns to step 202. If the input mode does not change, and the user provides further input 210, the method returns to step 204 to accept additional input using the same reference point 703. Alternatively, a new reference point 703 can be established.

If no further input is received, the method ends 299.

Figure 3:
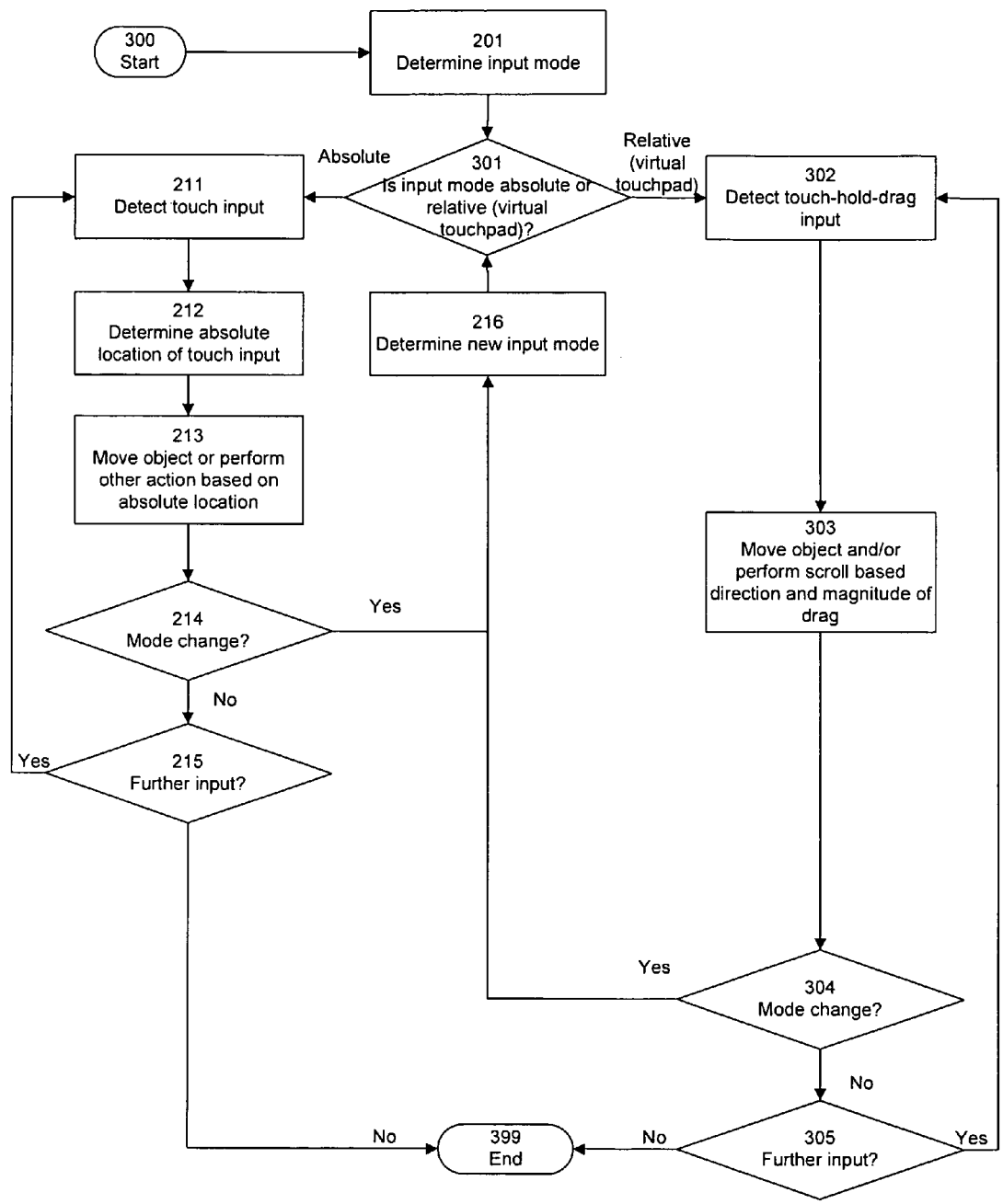
FIG. 3 is a flowchart depicting a method of interpreting user input on a touch-sensitive display screen capable of an absolute mode and a virtual touchpad relative mode, according to one embodiment of the present invention.

Referring now to FIG. 3, there is shown a flowchart depicting a method of interpreting user input on a touch-sensitive display screen capable of an absolute mode and a virtual touchpad relative mode, according to one embodiment of the present invention.

The method begins 300. An input mode is determined 201. The input mode can be explicitly selected by the user, or can be automatically determined based on the nature of the content being displayed, the state of the device, or the nature of the input. Based on the determination, a decision 301 is made as to whether to execute steps 211 through 215 (for absolute mode) or steps 302 through 305 (for virtual touchpad relative mode).

As described above in connection with FIG. 2, if absolute mode is active, touch input is detected 211 and the absolute location of the touch input is determined 212. Then, onscreen cursor 502 (or other object) is moved to the determined location. Alternatively, some action is performed responsive to the touch input; for example, an icon or object can be activated in response to the user tapping on it. If the input mode changes 214, the new input mode is determined 216 and the method returns to step 202. If the input mode does not change, and the user provides further input 215, the method returns to step 211. If no further input is received, the method ends 299.

If, in step 301, virtual touchpad relative mode is active, touch-hold-drag input is detected 302. This type of input usually consists of the user making contact with the touch-sensitive display screen 101, and then moving his or her finger along screen 101 while maintaining contact. When in virtual touchpad relative mode, this type of input is interpreted as it would be for a touchpad. Specifically, an on-screen object (such as cursor 502) is moved according to the direction and magnitude of the drag input. Alternatively, content on screen 101 (or on a portion of screen 101) is scrolled according to the direction and magnitude of the drag input. As described above, while performing touch-hold-drag input, the user can lift his or her finger from screen 101 and initiate contact at another location on screen 101. Cursor 502 does not change location while the user's finger is not in contact with screen 101. This provides a way for a user to continue moving cursor 502 in a given direction even after the user's finger has reached an edge of screen 101; the user can reposition his or her finger at a location on screen 101 that permits continued dragging in the same direction.

If the input mode changes 304, the new input mode is determined 216 and the method returns to step 301. If the input mode does not change, and the user provides further input 305, the method returns to step 302 to accept additional input.

If no further input is received, the method ends 399.

One skilled in the art will recognize that the methods of FIGS. 2 and 3 can be combined to implement a device capable of at least three modes of user input: absolute mode, virtual joystick relative mode, and virtual touchpad relative mode. Any combination of the described modes can be implemented without departing from the essential characteristics of the claimed invention.

Figure 4:
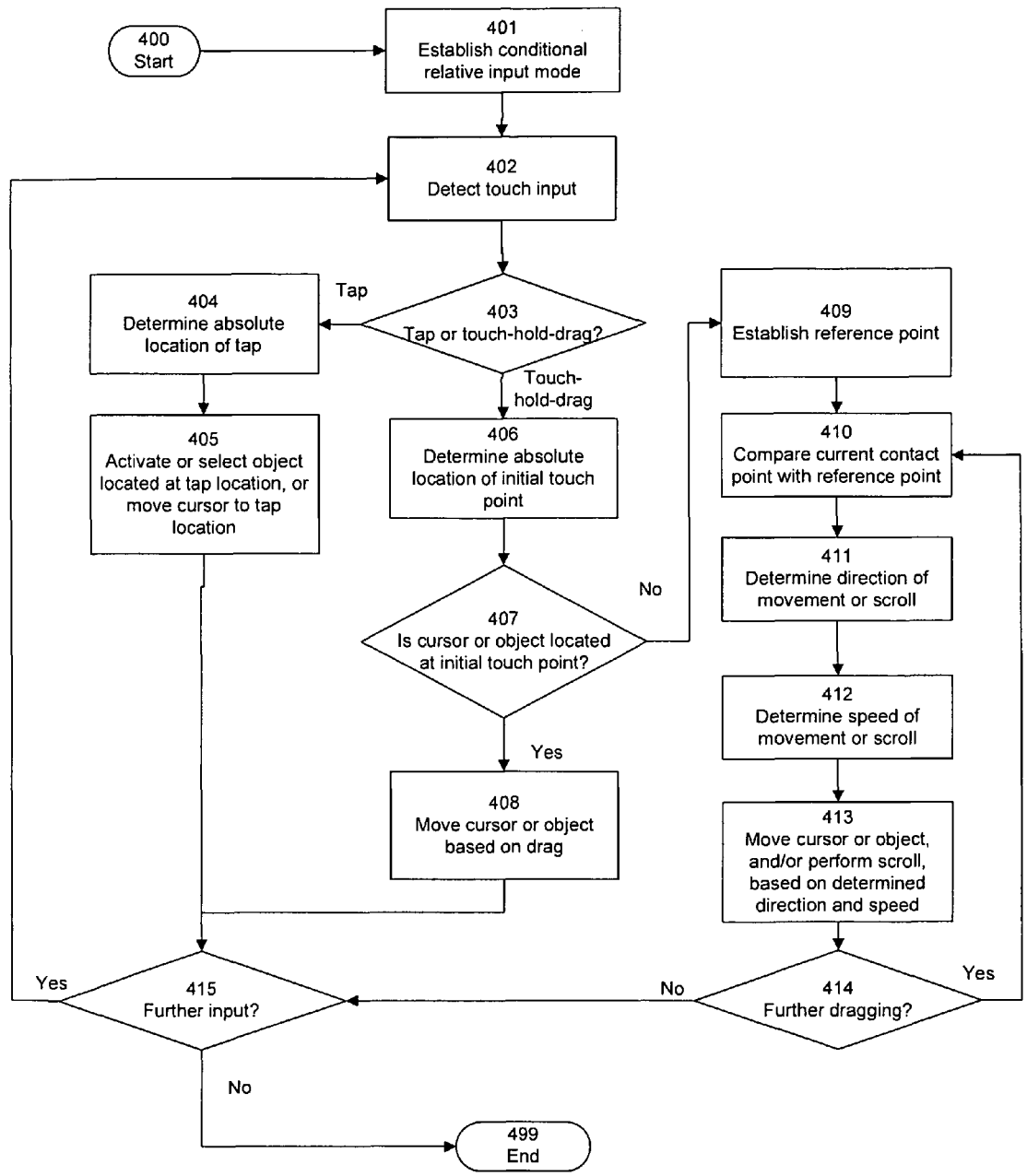
FIG. 4 is a flowchart depicting a method for a conditional relative input mode, wherein user input is interpreted in either a relative or absolute sense depending on the type of touch input received, according to one embodiment of the present invention.

Referring now to FIG. 4, there is shown a flowchart depicting a method for a conditional relative input mode, wherein user input is interpreted in either a relative or absolute sense depending on the type of touch input received, according to one embodiment of the present invention. Such a mode may be used, for example, to automatically select a mode without requiring the user to affirmatively select one. In the flowchart of FIG. 4, a particular set of conditions is depicted as triggering relative input mode; however, one skilled in the art will recognize that conditional relative input mode can be implemented with other sets of conditions to trigger relative input mode.

The method begins 400. A conditional relative input mode is established 401, wherein some input may be interpreted according to a relative input paradigm. In one embodiment, the conditional relative input mode is manually activated; in another embodiment, it is activated by default when device 100 is in operation; in yet another embodiment, it can be activated for certain applications, environments, and/or contexts.

Touch input is detected 402. A determination is made 403 as to whether the touch input consisted of a tap or a touch-hold-drag. In one embodiment, a tap consists of a touch and release without substantial movement of the finger during contact with screen 101, whereas a touch-hold-drag consists of the user making contact with the touch-sensitive display screen 101, and then moving his or her finger along screen 101 while maintaining contact. In one embodiment, tap input can include sustained contact with screen 101 for any length of time; in another embodiment, sustained contact beyond a predetermined period of time is interpreted as touch-hold-drag even if no substantial movement of the finger is detected.

In the example of FIG. 4, tap input is interpreted according to an absolute input paradigm. Accordingly, if tap input is detected in step 403, the absolute location of the tap input is determined 404. An object at this location is activated or selected 405, depending on the context of the input operation and possibly on other factors. Alternatively, cursor 502 is moved to the tap location. If the user provides further input 415, the method returns to step 402 to accept additional input. If no further input is received, the method ends 499.

If touch-hold-drag input is detected in step 403, the absolute location of the initial touch point is determined 406. In the example of FIG. 6, touch-hold-drag input that begins on an area of screen 101 that displays an on-screen object or cursor 502 is interpreted in an absolute sense, whereas touch-hold-drag input that begins on an area of screen 101 that does not currently display an on-screen object or cursor 502 is interpreted in a virtual joystick relative sense. Accordingly, a determination is made 407 as to whether cursor 502 or some other object is located at the initial touch point. If so, that object or cursor 502 is moved 408 according to the drag input, and released at the appropriate location when the user releases his or her finger from screen 101. If the user provides further input 415, the method returns to step 402 to accept additional input. If no further input is received, the method ends 499.

If, in step 407, no cursor 502 or other object is located at the initial touch point, the touch-hold-drag input is interpreted in a relative sense. In the example of FIG. 4, this relative sense is substantially identical to the virtual joystick relative mode described above in connection with FIG. 2, although one skilled in the art will recognize that the method could be implemented with a virtual touchpad relative mode as described above in connection with FIG. 3.

Reference point 703 is established 409. As discussed above, reference point 703 can be fixed at the center of screen 101, or at the center of a display area of screen 101, or at some other predetermined location, or it can be established at the current location of cursor 502, or at a location indicated by the user, for example at an initial point of contact with screen 101 after relative mode has been activated.

The location of the current contact point is compared 410 with reference point 703, to determine a direction and magnitude of a vector having a start point at the reference point 703 and an end point at the location of the current contact point. Then, a direction of movement or scroll operation is determined 411, based on the direction of the vector. A speed of movement or scroll operation is determined 412 as well; as described above, this can be a fixed speed, or based on the magnitude of the vector, or based on some other factor. Again, if the speed is based on the magnitude of the vector, the relationship between magnitude and speed of movement (or scroll operation) can be linear, geometric, logarithmic, or exponential; alternatively, any other relationship can be used.

Cursor 502 (or other object) is moved, and/or scrolling is performed 413, based on the determined direction and speed.

If the user continues the touch-hold-drag input by maintaining contact with screen 101, the method returns to step 410 to accept additional input using the same reference point 703.

Otherwise, if the user provides further input 415, the method returns to step 402 to accept additional input. If no further input is received, the method ends 499.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference herein to "one embodiment", "an embodiment", or to "one or more embodiments" means that a particular feature, structure, or characteristic described in connection with the embodiments is included in at least one embodiment of the invention. Further, it is noted that instances of the phrase "in one embodiment" herein are not necessarily all referring to the same embodiment.

Some portions of the above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Further, the computers referred to herein may include a single processor or may be architectures employing multiple processor designs for increased computing capability.

The algorithms and displays presented herein are not inherently related to any particular computer, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter.

Accordingly, the disclosure of the present invention is intended to be illustrative, but not limiting, of the scope of the invention, which is set forth in the claims.

What is claimed is:

1. A method for operating a computing device, the method being performed by one or more processors and comprising:
    determining an input mode for operating the computing device;
    in response to the computing device being operated in an absolute input mode:
        receiving a user input on a touch-sensitive display screen of the computing device;
        determining an absolute location of the user input; and
        performing a first operation that includes at least one of (i) moving a cursor or a displayed object on the touch-sensitive display screen to the absolute location, or (ii) selecting an interface feature that is provided at the absolute location; and
    in response to the computing device being operated in a relative input mode:
        establishing a reference location on the touch-sensitive display screen;
        receiving a user input at a second location on the touch-sensitive display screen;
        comparing the second location with the reference location to determine a direction and a magnitude of a vector having a start point at the reference location and an end point at the second location; and
        performing a second operation that includes causing the cursor or the displayed object to move on the touch-sensitive display screen by an amount corresponding to the direction and the magnitude of the vector.

2. The method of claim 1, wherein determining an input mode includes at least one of (i) receiving a user selection of the absolute input mode or the relative input mode, or (ii) determining the input mode based on content that is displayed on the touch-sensitive display screen.

3. The method of claim 1, wherein performing the second operation includes continuing to move the cursor or the displayed object on the touch-sensitive display screen by the amount corresponding to the direction and the magnitude of the vector until user input at the second location is completed.

4. The method of claim 1, further comprising, in response to the computing device being operated in the relative input mode:
    receiving additional user input indicating that an object being in contact with the touch-sensitive display screen is moving from the second location to a third location; and
    in response to receiving the additional user input, (i) comparing the third location with the reference location to determine a second direction and a second magnitude of a second vector having a start point at the reference location and an end point at the third location, and (ii) continuing to move the cursor or the displayed object on the touch-sensitive display screen by an amount corresponding to the second direction and the second magnitude of the second vector.

5. The method of claim 1, wherein establishing the reference location includes receiving an initial user input at an initial location on the touch-sensitive display screen.

6. The method of claim 1, further comprising:
    displaying a graphical indicator to identify the determined input mode.

7. The method of claim 1, further comprising:
    in response to the computing device being operated in the relative input mode and subsequent to establishing the reference location on the touch-sensitive display screen, displaying an indication of the reference location.

8. The method of claim 1, wherein performing the second operation comprises performing an operation having a speed based on the direction and the magnitude of the vector.

9. The method of claim 1, wherein the computing device comprises at least one selected from the group consisting of:
   a telephone;
   a smartphone;
   a personal digital assistant;
   a computer;
   a handheld computer;
   a kiosk;
   an input terminal; and
   a remote control.

10. A non-transitory computer-readable medium storing instructions that, when executed by one or more processors, causes the one or more processors to:
   determine an input mode for operating a computing device;
   in response to the computing device being operated in an absolute input mode:
      receive a user input on a touch-sensitive display screen of the computing device;
      determine an absolute location of the user input; and
      perform a first operation that includes at least one of (i) moving a cursor or a displayed object on the touch-sensitive display screen to the absolute location, or (ii) selecting an interface feature that is provided at the absolute location; and
   in response to the computing device being operated in a relative input mode:
      establish a reference location on the touch-sensitive display screen;
      receive a user input at a second location on the touch-sensitive display screen;
      compare the second location with the reference location to determine a direction and a magnitude of a vector having a start point at the reference location and an end point at the second location; and
      perform a second operation that includes causing the cursor or the displayed object to move on the touch-sensitive display screen by an amount corresponding to the direction and the magnitude of the vector.

11. The non-transitory computer-readable medium of claim 10, wherein the instructions cause the one or more processors to determine an input mode by at least one of (i) receiving a user selection of the absolute input mode or the relative input mode, or (ii) determining the input mode based on content that is displayed on the touch-sensitive display screen.

12. The non-transitory computer-readable medium of claim 10, wherein the instructions cause the one or more processors to perform the second operation by continuing to move the cursor or the displayed object on the touch-sensitive display screen by the amount corresponding to the direction and the magnitude of the vector until user input at the second location is completed.

13. The non-transitory computer-readable medium of claim 10, wherein the instructions cause the one or more processors to, in response to the computing device being operated in the relative input mode:
   receive additional user input indicating that an object being in contact with the touch-sensitive display screen is moving from the second location to a third location; and
   in response to receiving the additional user input, (i) compare the third location with the reference location to determine a second direction and a second magnitude of a second vector having a start point at the reference location and an end point at the third location, and (ii) continue to move the cursor or the displayed object on the touch-sensitive display screen by an amount corresponding to the second direction and the second magnitude of the second vector.

14. The non-transitory computer-readable medium of claim 10, wherein the instructions cause the one or more processors to establish the reference location by receiving an initial the user input at an initial location on the touch-sensitive display screen.

15. The non-transitory computer-readable medium of claim 10, wherein the instructions cause the one or more processors to display a graphical indicator to identify the determined input mode.

16. The non-transitory computer-readable medium of claim 10, wherein the instructions cause the one or more processors to, in response to the computing device being operated in the relative input mode and subsequent to establishing the reference location on the touch-sensitive display screen, display an indication of the reference location.

17. The non-transitory computer-readable medium of claim 10, wherein the instructions cause the one or more processors to perform the second operation by performing an operation having a speed based on the direction and the magnitude of the vector.

18. The non-transitory computer-readable medium of claim 10, wherein the computing device comprises at least one selected from the group consisting of:
   a telephone;
   a smartphone;
   a personal digital assistant;
   a computer;
   a handheld computer;
   a kiosk;
   an input terminal; and
   a remote control.

* * * * *